United States Patent [19]

Lewis, Jr. et al.

[11] Patent Number: 4,594,607

[45] Date of Patent: Jun. 10, 1986

[54] DEMODULATOR FOR SAMPLED CHROMINANCE SIGNALS INCLUDING A NYQUIST FILTER FOR RECOVERING WIDEBAND I COLOR DIFFERENCE SIGNALS

[75] Inventors: Henry G. Lewis, Jr., Hamilton Square; Leonard N. Schiff, Lawrence Township, Mercer County, both of N.J.

[73] Assignee: RCA Corporation, Princeton, N.J.

[21] Appl. No.: 619,369

[22] Filed: Jun. 11, 1984

[51] Int. Cl.⁴ ............................................... H04N 9/64
[52] U.S. Cl. ...................................................... 358/23
[58] Field of Search ........................................... 358/23

[56] References Cited

U.S. PATENT DOCUMENTS

| | | | |
|---|---|---|---|
| 2,799,723 | 7/1957 | Torre et al. | 358/38 |
| 2,857,457 | 10/1958 | Richman | 358/36 |
| 3,535,438 | 10/1970 | Parker | 358/28 |
| 3,871,023 | 3/1975 | Caprio | 358/28 |
| 4,205,335 | 5/1980 | Nakagawa et al. | 358/23 |
| 4,389,665 | 6/1983 | Nagao et al. | 358/23 |

OTHER PUBLICATIONS

Stein, S. Schwartz M. S., & Bennett, W. R., *Communications Systems and Techniques*, McGraw Hill, 1966, pp. 187–193.

*Primary Examiner*—John W. Shepperd
*Attorney, Agent, or Firm*—E. M. Whitacre; P. J. Rasmussen; K. N. Nigon

[57] ABSTRACT

Apparatus is disclosed for demodulating sampled data chrominance signals that include a first component that modulates a carrier to produce asymmetrical sidebands, and a second component modulated in quadrature to produce double sidebands. Samples representing the second component are derived and subtracted from the chrominance samples. The samples produced represent the asymmetrical sideband component. These samples are passed through a Nyquist filter to produce samples representing the first component signal but having the frequency spectrum of a vestigial sideband modulated signal. Demodulation of these samples by conventional means produces samples of the first component signal having a uniform range of amplitude values over the frequency band of the first signal.

8 Claims, 8 Drawing Figures

DEMODULATOR FOR SAMPLED CHROMINANCE SIGNALS INCLUDING A NYQUIST FILTER FOR RECOVERING WIDEBAND I COLOR DIFFERENCE SIGNALS

The present invention relates generally to video signal processing apparatus and particularly to chrominance signal demodulating apparatus used in video signal processors that operate on sampled chrominance signals.

An NTSC baseband composite video signal includes a luminance signal component that describes the brightness of an image and a chrominance signal component, containing I and Q color difference signal components that describe the hue and saturation of colors in the image. The Q component of the chrominance signal has a frequency bandwidth of approximately 500 KHz and is double-sideband modulated onto a suppressed color subcarrier signal.

The I component has a bandwidth of approximately 1.2 MHz and is modulated with asymmetrical sidebands onto a suppressed color subcarrier signal that is in quadrature phase with the subcarrier of the Q component. The sidebands are asymmetrical because the lower frequency component of the I signal (from 0 to 500 KHz) is double sideband modulated onto the subcarrier while the higher frequency component (from 500 KHz to 1.2 MHz) is single sideband modulated. This difference between the high and low frequency components makes demodulation of the I signal difficult.

If the I signal is demodulated as a double sideband signal, the high frequency component has a range of amplitude values only half as large as the low frequency component. A double sideband demodulator, therefore, would preferably include a baseband equalizing filter to make the amplitude ranges more uniform over the I signal frequency band. An I color difference signal with a uniform range of amplitude values is desirable since it can be combined with the luminance and Q color difference signals in a simple matrix circuit to produce primary color signals.

If the modulated I signal were converted to single sideband form—by removing the narrow sideband—and then demodulated, the range of amplitude values would uniform over the I signal frequency band. However, complete removal of the narrow sideband without affecting the wide sideband is not feasible. Any realizable filter would have a roll off in its characteristic that would either attenuate the low frequency component of the wide sideband or fail to remove all of the narrow sideband. Minimization of this roll off adds to the cost of the filter, failure to minimize may require baseband equalization of the signal passed by the filter.

The baseband equalizing filter used with either of these demodulation techniques would preferably have a carefully designed frequency characteristic. This characteristic should compensate the attenuated portion of the I signal frequency band to provide an output signal with an essentially uniform range of amplitude values over the entire I signal spectra.

In a sampled data system, this equalization may be accomplished with a finite impulse response (FIR) filter. However, a relatively large number of delay stages, sample scaling elements and adders are needed for this type of filter to accurately produce the desired characteristic. Consequently, the filter is an expensive component.

Demodulation of the I and Q signal components of a sampled chrominance signal is further complicated by I signal quadrature distortion terms in the Q signal components of the chrominance signal. Without additional filtering, neither of the demodulation techniques described above would adequately compensate for this quadrature distortion signal. Consequently, the image produced by the I and Q signals derived by these techniques may have color hue errors and excessive color noise.

It is an object of the present invention to produce a demodulating system for sampled chrominance signals that is relatively inexpensive and yet provides full bandwidth I color difference signals having an essentially constant range of amplitude values over the frequency band of the I signal and minimal distortion due to crosstalk between the I and Q signals.

SUMMARY OF THE INVENTION

Accordingly, the present invention is an improved apparatus for demodulating sampled chrominance signals. The apparatus includes a filtering system that derives, from a sampled chrominance signal, samples that represent the Q signal sidebands to the substantial exclusion of any I signal components. These samples are subtracted from the chrominance signal samples, leaving samples that accurately describe the asymmetrical sideband modulated I signal. A Nyquist filter converts this asymmetrical sideband signal to a vestigial sideband signal. The vestigial sideband I signal is demodulated by conventional techniques to provide an I signal having a substantially uniform range of amplitude values over its entire frequency band and minimal distortion due to crosstalk between the I and Q signals.

The chrominance component of a composite video signal includes I and Q color difference signal components modulated as described above. This chrominance signal includes low frequency double-sideband modulating I and Q signal components, $I_L(t)$ and $Q_L(t)$ respectively, and a high frequency single-sideband modulating I signal component, $I_H(t)$. The single sideband modulation results in a signal, $\hat{I}_H(t)$, that is shifted 90° from $I_H(t)$ and proportional to the Hilbert transform of the high frequency I component. The signal $\hat{I}_H(t)$ is a quadrature distortion signal which contaminates the high frequency spectrum of the Q signal. If the suppressed carrier modulated by these signals is represented as $\cos \omega t$, the equation:

$$S_I(t) = (I_L(t) + \tfrac{1}{2}I_H(t)) \cos \omega t + \tfrac{1}{2}\hat{I}_H(t) \sin \omega t \tag{1}$$

describes the asymmetrical sideband modulation of the I subcarrier by the I color difference signal.

Similarly, if Q(t) represents the Q color difference signal and if the Q subcarrier signal is phase shifted from the I subcarrier signal by −90°, the equation:

$$S_Q(t) = Q(t) \sin(\omega t) \qquad (2)$$

describes the double sideband modulation of the Q subcarrier signal by the Q color difference signal. When these two equations are superposed, an equation describing the chrominance component, $S_c(t)$, of the baseband video signal is obtained:

$$S_c(t) = (I_L(t) + \tfrac{1}{2}\hat{I}_H(t)) \cos \omega t + (Q(t) + \tfrac{1}{2}\hat{I}_H(t)) \sin \omega t. \qquad (3)$$

Consider this chrominance signal to be sampled synchronously with a phase locked clock signal at four times the color subcarrier signal. In this instance adjacent samples are 90° apart relative to the subcarrier phase. Alternate samples correspond to the magnitudes of a cos ωt term, and the sin ωt term respectively. In the NTSC system these terms may be described as alternating I and Q samples where consecutive I and consecutive Q samples have opposite signs i.e. +I, +Q, −I, −Q, +I, +Q, −I, −Q, etc. (note that the signs indicate sampling phase, not sample polarity). If the I and Q samples represent the I and Q color difference signals respectively, it follows from the signal analysis above that if the I samples are the cos ωt terms, the Q samples are sin ωt terms. From equation 3, the Q samples are seen to include a quadrature distortion term: the Hilbert transform of the high frequency I signals, $\hat{I}_H(t)$. It is desirable to remove this component from the Q samples before demodulating to recover the Q signal and to incorporate this component with the I samples before demodulating to recover the I signal. Apparatus that demodulates the I and Q color difference signals in this manner is described below.

The following description is of a digital embodiment of the present invention. It is to be understood, however, that the invention may also be practiced in any discrete-time sampled-data system such as one employing charge coupled devices. Broad arrows in the drawings represent busses for multiple-bit parallel digital signals. Line arrows represent connections carrying analog signals or single-bit digital signals.

Figure 1:
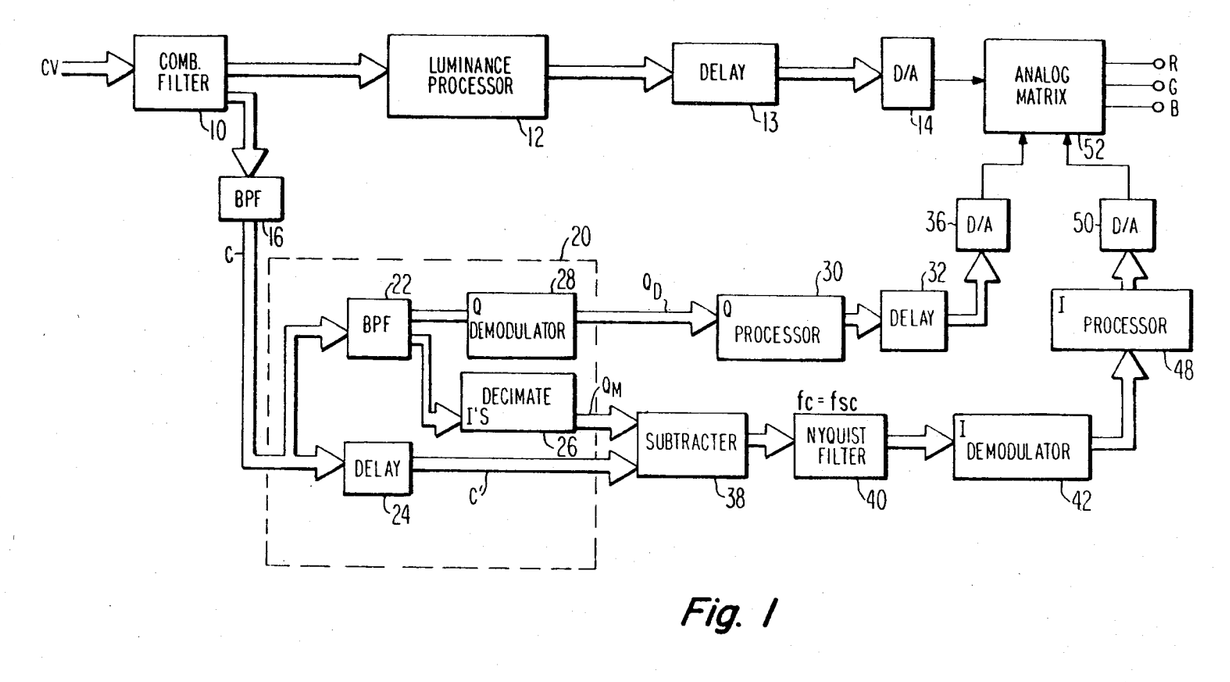
FIG. 1 is a block diagram of chrominance signal processing apparatus incorporating the present invention.

In FIG. 1, digital samples representing composite video signals which may be from the video detector of a color television receiver are applied to input terminal CV of comb filter 10. Filter 10 separates the luminance and chrominance signal components from the composite video samples. The digital luminance samples are applied to luminance processor 12 where they may be filtered for noise reduction and peaked to compensate for attenuation of high frequency components. These processed luminance samples are applied to digital to analog converter 14 where they are converted to an analog luminance signal.

The chrominance samples from filter 10 are applied to band pass filter 16, which may have a pass band from 2.38 MHz to 4.08 MHz, to remove low frequency luminance signal artifacts from the chrominance samples. Chrominance samples from filter 16 are applied to band pass filter 22 and delay 24 via bus C. Filter 22, which may have a pass band from 3.08 MHz to 4.08 MHz, removes all high frequency I signal components including the Hilbert transformed I components that contaminate the Q samples, from the chrominance samples. Decimating element 26, synchronized to the system clock signal, replaces alternate (I signal) samples supplied by filter 22 with samples of a reference value (e.g. 0). The filtered and decimated samples from decimating element 26, and available on bus QM, contain the components of the Q samples that represent the double sideband modulated Q color difference signal and zero valued samples in the +I and −I sample positions.

The band pass filtered chrominance samples from filter 22 are also applied to demodulator 28 which replaces the I chrominance samples by the preceeding Q samples and then changes the polarity of alternate pairs of the Q samples. The demodulated Q color difference signal samples on bus QD are applied to Q sample processor 30 where they may, for example, be processed for noise reduction and autoflesh correction. Q samples from processor 30 are thereafter converted into an analog Q signal by digital to analog converter 36.

Chrominance samples from band pass filter 16 are delayed by delay element 24 and applied to subtracter 38 via bus C'. This delay synchronizes the chrominance samples to the filtered and decimated samples on bus QM. Subtractor 38 subtracts the double sideband Q signal samples on bus QM from the chrominance signal samples on bus C'. The difference samples provided by subtractor 38 are chrominance samples minus the double sideband Q signal component and, so, represent the asymmetrical sideband I color difference signal. These difference samples are applied to Nyquist filter 40 which produces samples that represent the same I color difference signal, but having the frequency spectrum of a vestigial-sideband modulating signal. This frequency spectrum, as will be explained below, allows the signal provided by filter 40 to be demodulated by conventional means into samples representing the I color difference signal and having a substantially uniform range of amplitude values over the full I signal frequency band.

Demodulator 42 is such a conventional demodulator. It replaces alternate ones of the samples provided to it (the samples in the +Q and −Q positions) by the immediately preceding I signal samples and changes the polarity of the −I samples. Demodulator 42 provides, therefore, consecutive +I samples representing a demodulated I signal. These samples are applied to I sample processor 48 where they may, for example, be filtered for noise reduction and subject to autoflesh correction.

The samples provided by processor 48 are converted into an analog I color difference signal by digital to analog converter 50. This analog signal is combined in matrix 52 with the delayed analog Q color difference signal and the delayed luminance signal from digital to analog converters 36 and 14 respectively. The outputs of matrix 52 are the red, green and blue primary color signals appearing at terminals R, G and B respectively. These signals may be applied to a display device (not shown) to reproduce a color image.

The signal processing paths for the luminance I and Q signal samples may have different processing delays. It may, therefore, be necessary to include compensating delays in as many as two of the three signal processing paths. These delays are illustrated by way of example by elements 13 and 32.

Figure 2:
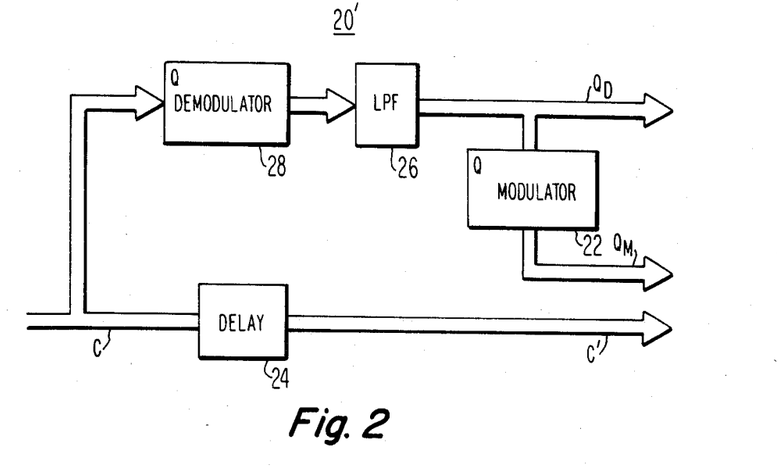
FIG. 2 is a block diagram of an alternate embodiment of part/of the apparatus shown in FIG. 1.

FIG. 2 shows an alternative embodiment of the apparatus, shown in broken line box 20 of FIG. 1, which develops samples representing the double sideband Q signal component of the chrominance signal. Chrominance signal samples from bus C are applied to demodulator 28 and to delay 24. Demodulator 28 replaces the I chrominance samples by the Q samples that immediately preceed them and changes the polarity of the −Q samples. The samples provided by demodulator 28, therefore, are all +Q samples. Low pass filter 26, which may, for example, have a pass band from 0 to 500 KHz, accepts these +Q samples and filters them to remove the high frequency components that correspond to the Hilbert transform of the single-sideband modulating I signal. Samples from the output of filter 26 are provided to bus QD for further processing as shown in FIG. 1. These demodulated samples are also provided to Q signal modulator 22. Modulator 22 replaces alternate samples (the ones in the +I and −I positions) by a reference value (e.g. 0), and changes the polarity of alternate ones of the remaining Q samples. The samples from modulator 22, available on bus QM, represent the modulated double-sideband Q signal component of the chrominance samples.

The delay element 24 has the same function in this embodiment as in the embodiment of FIG. 1: to synchronize the chrominance samples on bus C to the modulated Q samples on bus QM.

Figure 3:
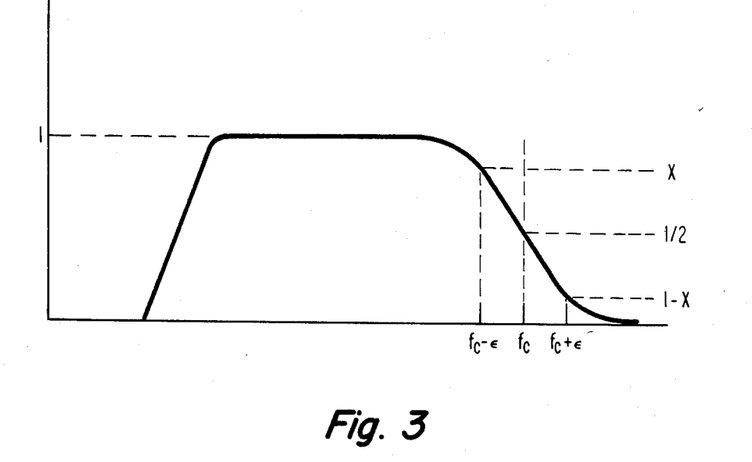
FIG. 3 is a frequency characteristic graph useful in explaining the operation of the apparatus shown in FIGS. 1 and 2.

FIG. 3 shows the frequency characteristic of a Nyquist filter. This is a band pass filter characteristic that has a high frequency roll off which is symmetric about a central frequency, $f_c$. If the gain of the filter for frequencies in its pass band is unity, the gain at $f_c$ is $\frac{1}{2}$. In general, the gains at any two frequencies equally displaced about $f_c$ sums to unity. For example, if the gain of the filter at frehe gains at any two frequencies equally displaced about $f_c$ sums to unity. For example, if the gain of the filter at frequency $f_c-\epsilon$ is X, then the gain at $f_c+\epsilon$ is $1-X$.

The pass band of the Nyquist filter 40 in FIG. 1 is wide enough to accommodate the lower sideband of the modulated I signal. The central frequency in the high frequency roll off of the filter is the carrier frequency of the modulated I signal. As the samples from subtractor 38, representing the asymmetrical sideband modulated I signal, are processed by this filter, samples are produced which represent a vestigial-sideband modulated I signal. When these samples are demodulated, the contributions of upper and lower sidebands are complementary for frequencies rolled off by this filter. Consequently, the samples obtained are substantially the same as would be obtained by demodulating one complete sideband.

Figure 4A:
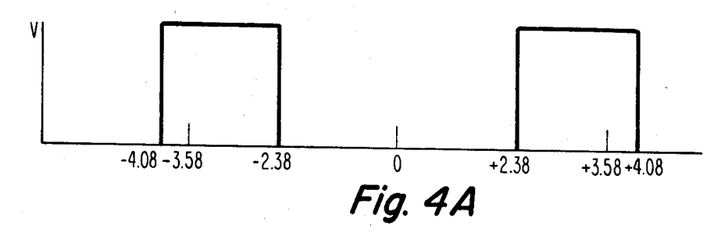
FIGS. 4A through 4D are graphical representations of the I signal frequency spectrum useful in explaining the operation of the apparatus shown in FIGS. 1 and 2.
Figure 4B:
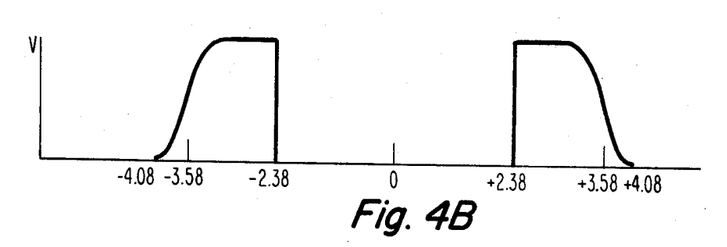
Figure 4C:
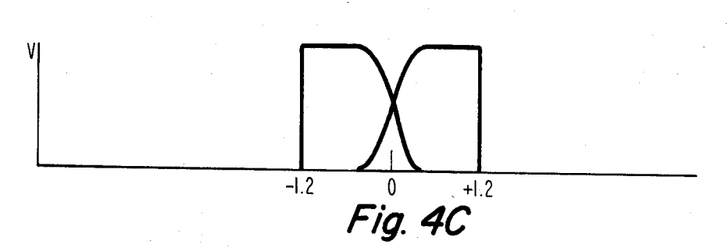
Figure 4D:
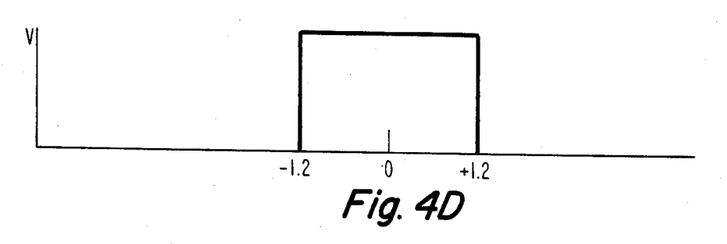

This process may be more easily understood with reference to FIGS. 4A through 4D. FIG. 4A shows the frequency spectrum of the asymmetrical-sideband modulated I signal component of a composite video signal. FIG. 4B shows the same signal after it has been passed through a Nyquist filter having the above-described frequency characteristic. When this signal is demodulated, both the positive and negative frequency components are translated to lower frequencies. The frequency spectra of the positive and negative components cross at 0 Hz, the demodulated carrier frequency, as shown in FIG. 4C. These frequency spectra sum to produce the spectrum shown in FIG. 4D, which is essentially flat across the frequency band of the demodulated I signal.

Figure 5:
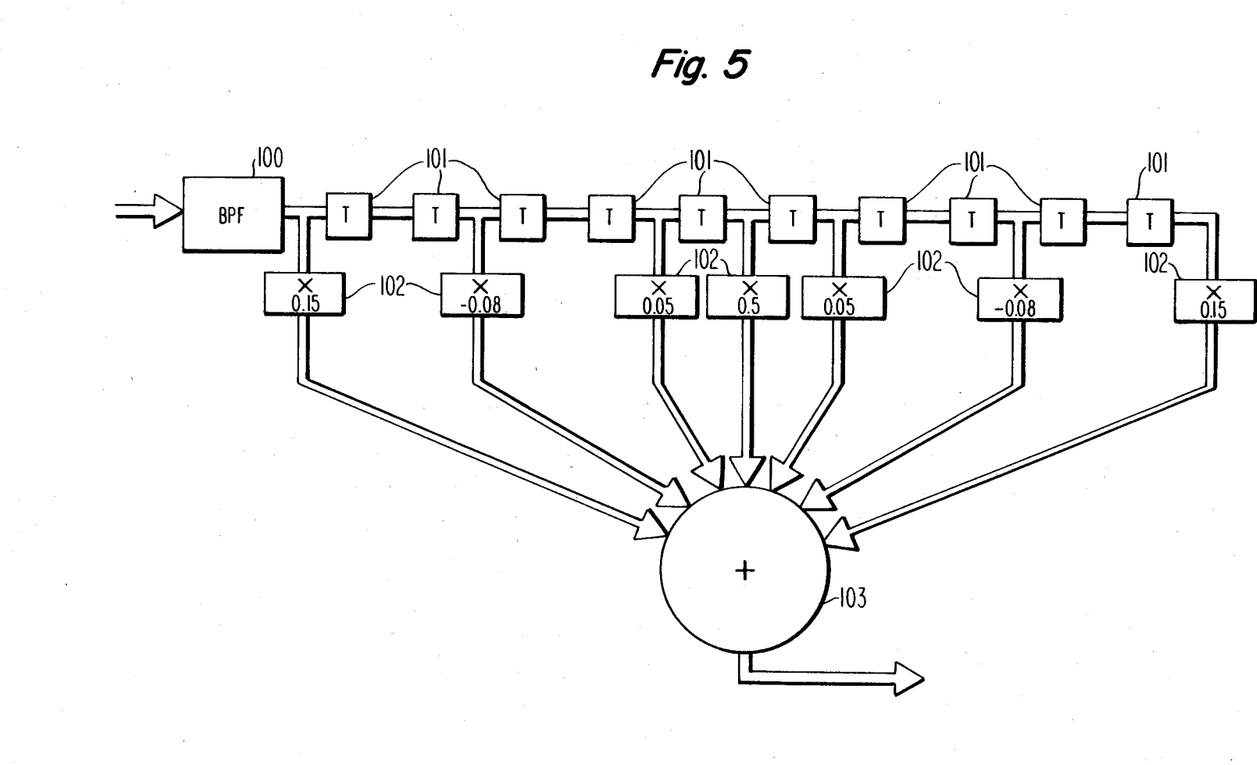
FIG. 5 is an embodiment of a FIR Nyquist filter suitable for use in the embodiments shown in FIGS. 1 and 2.

FIG. 5 shows a Nyquist filter suitable for use in the embodiments of the invention shown in FIGS. 1 and 2. This filter is actually two cascaded FIR filters. The band pass filter 100 which may, for example, have a pass band from 2.38 MHz to 4.08 MHz passes the entire asymmetrical sideband modulated I signal. A second output weighted FIR filter comprising delay elements 101, sample scalers 102 and summer 103 is a low pass filter which provides a high frequency roll off that is symmetric about the color subcarrier frequency. Band pass filtered samples from filter 100 are delayed one clock period by each of the delay elements 101. Delayed samples are multiplied by weighting factors in the sample scalers 102. The weighted samples are then added in summer 103 to provide the output of the filter. Exemplary weighting factors that define a roll off characteristic exhibiting odd symmetry about the color subcarrier frequency are shown in FIG. 5.

The filter shown in FIG. 5 is only one of many possible Nyquist filters that could be used with the present invention. It is contemplated, for example, that a single FIR filter can be used in place of the two cascaded filters and that the width of the transition band which defines the high frequency roll-off of the filter can range from 0 Hz to the bandwidth of the double sideband modulated portion of the I color difference signal.

It is further contemplated that the Q demodulator 28 and the I demodulator 42 may provide samples at the clock rate, four times the subcarrier frequency ($4f_{sc}$), or at one-half or one-quarter of this rate. If the I demodulator 42 provides samples at a $4f_{sc}$ rate, the demodulator may invert the sign of alternate ones of the samples provided to it by Nyquist filter 40 and pass these samples to I sample processor 48. The demodulation step of replacing alternate ones of the samples from filter 40 by the immediately preceeding samples may be omitted.

Moreover, it is contemplated that digital to analog converters 14, 36, and 50 may be omitted and that the analog matrix 52 may be replaced by a digital matrix.

We claim:

1. In a video signal processor including a source of I and Q chrominance samples, said I chrominance samples representing asymmetrical-sideband modulated I color difference signals wherein the frequency band of a first sideband is wider than a second sideband, and said Q chrominance samples representing double-sideband modulated Q color difference signals plus quadrature crosstalk components of said I color difference signals, apparatus comprising:

separating means responsive to said chrominance samples for providing samples representative of said asymmetrical sideband modulated I signal and of the quadrature crosstalk I signal components of said Q samples to the substantial exclusion of the double-sideband modulated Q signal component of said Q chrominance samples;

Nyquist filtering means coupled to said separating means for providing a vestigial sedeband modulated signal representing said I signal; and demodulating means coupled to said Nyquist filtering means for providing samples representative of said I signal and having a substantially uniform range of amplitude values over a frequency band substantially equal in width to said first I signal sideband.

2. The apparatus of claim 1 wherein the separating means comprises:
   demodulating means responsive to said chrominance samples for providing samples representative of said Q signal and having a frequency band substantially equivalent to the frequency band of the lower I signal sideband;
   low pass filtering means for limiting the frequency band of the samples provided by said demodulating means to the width of the upper Q signal sideband of said chrominance signal;
   modulating means coupled to said low pass filtering means for providing samples representative of the double-sideband modulated Q signal to the substantial exclusion of said I signal;
   means for subtracting the samples provided by said modulating means from said chrominance samples to produce samples representative of the asymmetrical-sideband modulated I signal component of said chrominance signal to the substantial exclusion of the double-sideband modulated Q signal component of said chrominance signal.

3. The apparatus of claim 1 wherein the separating means comprises:
   a bandpass filter coupled to said source having a frequency band substantially equal to that of said upper I and Q signal sidebands;
   decimating means coupled to said bandpass filter for replacing I chrominance samples by a reference value;
   means for subtracting the samples provided by said decimating means from the chrominance samples provided by said source to produce samples representative of the asymmetrical-sideband modulated I signal component of said chrominance signal to the substantial exclusion of the Q signal component of said Q signal sidebands.

4. In a digital color television receiver for processing digital chrominance samples representing a chrominance signal that includes a double-sideband suppressed-carrier modulated Q signal component, an asymmetrical-sideband suppressed-carrier modulated I signal component and an I signal component which produces quadrature distortion; apparatus comprising:
   separating means for providing digital Q signal samples representative of the modulated Q signal component of the chrominance signal to the substantial exclusion of the modulated I signal component and of the quadrature distortion producing I signal component;
   subtraction means, coupled to said separating means, for subtracting said digital Q signal samples from said digital chrominance samples to produce digital samples representing a signal that includes said modulated I signal component and said quadrature distortion producing I signal component to the substantial exclusion of said modulated Q signal component;
   Nyquist filtering means coupled to said subtracting means for providing digital samples representing a vestigial sideband suppressed carrier modulated I signal; and
   demodulating means coupled to said Nyquist filtering means for providing digital samples representative of a demodulated I signal and having a substantially uniform range of amplitude values over a frequency band substantially equal in width to the wider sideband of said asymmetrically modulated I signal.

5. The apparatus of claim 4 wherein said separating means comprises:
   demodulating means responsive to said chrominance samples for providing samples representative of a demodulated Q signal and having a frequency band substantially equivalent to the larger of the frequency bands of the sidebands of said modulated I signal; and
   low pass filtering means for limiting the frequency band of the samples provided by said demodulating means to the width of one sideband of the modulated Q signal component of said chrominance signal.

6. The apparatus of claim 4 wherein said separating means comprises:
   a bandpass filter for modifying said digital chrominance samples to have a frequency band substantially equal to the frequency band of one sideband of the modulated Q signal component of said chrominance signal; and
   decimating means coupled to said bandpass filter for replacing the components of said modified chrominance samples that represent said I signal by a reference value.

7. In a video signal processor including a source of chrominance samples having alternating I and Q samples, said I samples having components that represent standard I color difference signals and said Q samples having components that represent standard Q color difference signals and components that represent I color difference signal components that produce quadrature distortion, apparatus comprising:
   demodulating means coupled to said source for separating the Q samples from said chrominance samples;
   low pass filtering means coupled to said demodulating means for removing the quadrature distortion producing I color difference signal components from said Q samples;
   modulating means coupled to said low pass filtering means for providing modulated samples having alternating low pass filtered Q samples and samples of a reference value and being synchronized to the Q and I samples of said chrominance samples respectively;
   means coupled to said source and to said modulating means for subtracting said modulated samples from said chrominance samples to provide samples representing said I color difference signals and said quadrature distortion producing I color difference signals; and
   Nyquist filtering means coupled to said subtracting means for providing Nyquist filtered samples representing said I signal;
   demodulating means coupled to said Nyquist filtering means for providing samples representing said I signal and having a substantially uniform range of amplitude values over the frequency band of said I signals.

8. In a video signal processor including a source of chrominance samples having alternating I and Q samples said Q samples having components that represent standard Q color difference signals and components that represent quadrature distortion producing I color difference signals, apparatus comprising:

bandpass filtering means for reducing the frequency band of said chrominance samples to remove components of the Q samples that represent the quadrature distortion producing I color difference signals;

decimating means coupled to said bandpass filtering means for substituting samples of a reference value for the I signal samples provided by said filtering means;

means for subtracting the samples provided by said decimating means from said chrominance samples to provide samples representing said I color difference signals and said quadrature distortion producing I color difference signals; and Nyquist filtering means coupled to said subtracting means for providing vestigial sideband filtered samples representing said I signal;

demodulating means coupled to said Nyquist filter for providing samples representing said I signal and having a substantially uniform range of amplitude values over the frequency band of said I signals.

* * * * *

UNITED STATES PATENT AND TRADEMARK OFFICE
CERTIFICATE OF CORRECTION

PATENT NO. : 4,594,607

DATED : June 10, 1986

INVENTOR(S): Henry G. Lewis, Jr. & Leonard Norman Schiff

It is certified that error appears in the above-identified patent and that said Letters Patent is hereby corrected as shown below:

Column 1, line 46   following "would" insert --be--.

Column 2, line 41   "part/of" should be --part of--.

Column 2, line 57   "$\hat{I}_H(t)$" should be --$I_{\hat{H}}(t)$--.

Column 2, line 58   "$I_H(t)$" should be --$\hat{I}_H(t)$--.

Signed and Sealed this

Seventeenth Day of March, 1987

Attest:

DONALD J. QUIGG

Attesting Officer

Commissioner of Patents and Trademarks